US005602844A

United States Patent [19]

Lyles

[11] Patent Number: 5,602,844

[45] Date of Patent: Feb. 11, 1997

[54] SELF ROUTING CROSSBAR SWITCH SUITABLE FOR USE AS A SWITCHING FABRIC IN AN ATM SWITCH

[75] Inventor: Joseph B. Lyles, Mountain View, Calif.

[73] Assignee: Xerox Corporation, Stamford, Conn.

[21] Appl. No.: 340,493

[22] Filed: Nov. 15, 1994

[51] Int. Cl.[6] .......... H04L 12/56

[52] U.S. Cl. .......... 370/395; 370/411

[58] Field of Search .......... 370/60, 60.1, 94.1, 370/94.2, 54, 58.2, 79, 58.1, 53, 61, 110.1, 63, 64, 65, 65.5, 67, 68, 68.1; 340/825.03, 826, 825.79, 825.8; 379/306, 335

[56] References Cited

U.S. PATENT DOCUMENTS 5,179,552 1/1993 Chao .......... 370/60
5,305,311 4/1994 Lyles .......... 370/60
5,327,420 7/1994 Lyles .......... 370/60
5,430,715 7/1995 Corbalis et al. .......... 370/60

*Primary Examiner*—Douglas W. Olms
*Assistant Examiner*—Dang Ton
*Attorney, Agent, or Firm*—Fay, Sharpe, Beall, Fagan, Minnich & McKee

[57] ABSTRACT

An expandable, self routing switching fabric routes data packets in an ATM switch. A crosspoint array of state machines disposed at internal intersections of input ports and output ports have predetermined identities representative of the output ports and include a comparator for identifying an address header of each data packet with the state machine identity. When a match occurs, the state machine is set active/connected and when a non-match occurs, the state machine is set not-active/disconnected. A circuit through the fabric is set by connection between an input port through an active/connected state machine to a desired output port. The predetermined identity of each state machine comprises a hard wired bit sequence common to the column including the state machines.

7 Claims, 4 Drawing Sheets

| TIME STEP \ COLUMN | 00 | 01 | 10 | 11 |
| --- | --- | --- | --- | --- |
| 0 | 1 | 1 | 1 | 1 |
| 1 | 0 | 0 | 1 | 1 |
| 2 | 0 | 1 | 0 | 1 |

| | | K VALUE = 0 | | | | | | | | K VALUE = 1 | | | | | | | |
|---|---|---|---|---|---|---|---|---|---|---|---|---|---|---|---|---|---|
| | | CHIP COL. 0 | | | | CHIP COL. 1 | | | | CHIP COL. 2 | | | | CHIP COL. 3 | | | |
| | OUTPUT NUMBER | 0 | 1 | 2 | 3 | 4 | 5 | 6 | 7 | 8 | 9 | 10 | 11 | 12 | 13 | 14 | 15 |
| TIME STEP | 0 | 1 | 1 | 1 | 1 | 1 | 1 | 1 | 1 | 1 | 1 | 1 | 1 | 1 | 1 | 1 | 1 |
| | 1 | 0 | 0 | 0 | 0 | 0 | 0 | 0 | 0 | 1 | 1 | 1 | 1 | 1 | 1 | 1 | 1 |
| | 2 | 0 | 0 | 0 | 0 | 1 | 1 | 1 | 1 | 0 | 0 | 0 | 0 | 1 | 1 | 1 | 1 |
| | 3 | 0 | 0 | 1 | 1 | 0 | 0 | 1 | 1 | 0 | 0 | 1 | 1 | 0 | 0 | 1 | 1 |
| | 4 | 0 | 1 | 0 | 1 | 0 | 1 | 0 | 1 | 0 | 1 | 0 | 1 | 0 | 1 | 0 | 1 |

TIME STEP 0 COMPARES ACTIVE BIT
TIME STEP 1 COMPARES k VALUE
TIME STEP 2 COMPARES CHIP COLUMN
TIME STEPS 3 & 4 COMPARE & SELECT COLUMNS WITHIN A CHIP

| INPUT | ADDRESS | CURRENT STATE | RESET | NEXT STATE |
|---|---|---|---|---|
| 0 | 0 | 0 | 0 | 0 |
| 0 | 1 | 0 | 0 | 0 |
| 1 | 0 | 0 | 0 | 0 |
| 1 | 1 | 0 | 0 | 0 |
| 0 | 0 | 1 | 0 | 1 |
| 0 | 1 | 1 | 0 | 0 |
| 1 | 0 | 1 | 0 | 0 |
| 1 | 1 | 1 | 0 | 1 |
| 0 | 0 | 0 | 1 | 1 |
| 0 | 1 | 0 | 1 | 0 |
| 1 | 0 | 0 | 1 | 0 |
| 1 | 1 | 0 | 1 | 1 |
| 0 | 0 | 1 | 1 | 1 |
| 0 | 1 | 1 | 1 | 0 |
| 1 | 0 | 1 | 1 | 0 |
| 1 | 1 | 1 | 1 | 1 |

SELF ROUTING CROSSBAR SWITCH SUITABLE FOR USE AS A SWITCHING FABRIC IN AN ATM SWITCH

BACKGROUND OF THE INVENTION

This invention relates to high-speed, broadband communication networks and, more particularly, to a self routing crossbar switch suitable for communicating data packets in an ATM switch.

High-speed, broad-band communication networks include systems for routing data packets from input sources to output sources. U.S. Pat. Nos. 5,305,311 and 5,327,420 disclose such switching networks. The basic architecture of such prior art systems include an Asynchronous Transfer Mode (ATM) Local Area Network (LAN) using a VLSI-based "Batcher/banyan" switching fabric of the type which has been developed by AT&T/Bellcore. Batcher/banyan switching technology will scale to switches larger than 256 ports, and link rates exceeding 1 gigabit/sec and these switches can be interconnected to form a larger hierarchical network for supporting larger user communities.

An advantage of such Batcher/banyan switch fabrics is that they are "self routing". That is, data packets are routed through the switching fabric on the basis of local decisions only, there is no global "chokepoint". For each stage in the network, routing can be determined with only the information contained in the data packets entering that stage of the switch; that is, with locally available information. Such networks are also advantageous when they are "non-blocking". In any switching cycle, the network is capable of generating an arbitrary permutation, or a partial permutation, of its inputs. More simply stated, a non-blocking switching fabric is able to generate all possible one to one input/output mappings in a single switching cycle.

Ideally such a switching fabric provides parallelism whereby a single N port Batcher sorting network can feed some number k (typically two or three) banyan routing switches that are connected so that as many as k-cells can be routed to the same number of output ports during the same cell switching cycle without losing any of the data packets. However, in order to overcome the problem that occurs when more than one data packet is found to be destined to the same output port during the single switch cycle, a "reservation ring" is provided for fairly adjudicating the contention among such conflicting data packets, while permitting at most k of them to be presented to the switch in any cycle. Reservation rings resolve output contentions among conflicting data packets, while implementing "fair" access to the output ports of the switching fabric.

The first bits of a data packet contain the address to which the packet should be routed. Such "first bits" are typically referred to as the "header", and identify the path through the switching fabric, the source and destination of which are input and output ports. For a particular switch, the input and output ports associated with a given virtual circuit are defined at connection establishment. A virtual circuit is thus the ultimate source and ultimate destination, and all the intermediate switches therebetween defining the path through the fabric. Accordingly, the contents of the header are defined by the virtual circuit as the path through the particular switching fabric. Switching fabric such as Batcher/banyans allow many possible paths between any given input and output pair and present a problem which is sought to be overcome by the present invention. The problem is that it is very difficult to diagnose failures in a Batcher/banyan switch fabric due to the multiple possible paths. A failure is difficult to replicate because of the many possible paths.

The present invention contemplates a new and improved switching fabric to replace the Batcher/banyan network of prior art systems, provide easier diagnosis of failures in the fabric than in the Batcher/banyan network, is simple in design, economical to manufacture and which provides better scaling properties than a Batcher/banyan for the size of the switching fabrics that the subject invention is applicable to be implemented as in a commercial embodiment.

BRIEF SUMMARY OF THE INVENTION

In accordance with the present invention, there is provided an expandable, self routing switching fabric for routing data packets in an ATM switch. The switching fabric includes a plurality of input ports and a plurality of output ports for outputting the packets from input sources coupled to the input ports to output destinations coupled to the output ports on circuits through the fabric specified by the packets. A crosspoint array comprised of state machines disposed at internal intersections of the input ports and the output ports provides the circuit. Each state machine has a predetermined identity representative of one of the output ports and includes a means for comparing the identity to an address header of each data packet and for setting each state machine active/connected when the comparing determines that there is a match between the identity and the address header and for setting each of the state machines not-active/disconnected when the comparing determines that a non-match between the identity and the address header is found. Thus, a selected circuit through the fabric to a desired output port will comprise an active-connected state machine from a one of the input ports to the desired output port.

The switching fabric of the invention comprises a crosspoint array wherein the input ports comprise a plurality of rows and the output ports comprise a plurality of columns. The selected circuit is the input row and the output column through the active/connected state machine defined by the desired output port.

In accordance with a more limited aspect of the subject invention, the predetermined identity of each state machine comprises a hard-wired bit sequence common to the column including the active/connected state machines defined by the desired output port.

One benefit obtained by the present invention is an ATM switch fabric which is simple in design and thus easier to diagnose for failures than prior art Batcher/banyan crossbar switches.

Another benefit obtained by the present invention is a switching fabric which has better scaling properties for small scaling values.

Other benefits and advantages for the subject invention will become apparent to those skilled in the art upon a reading and understanding of this specification.

BRIEF DESCRIPTION OF THE DRAWINGS

The invention may take physical form in certain parts and arrangements of parts, the preferred embodiments of which will be described in this specification and illustrated in the accompanying drawings which form a part hereof and wherein.

DETAILED DESCRIPTION OF THE INVENTION

Figure 1:
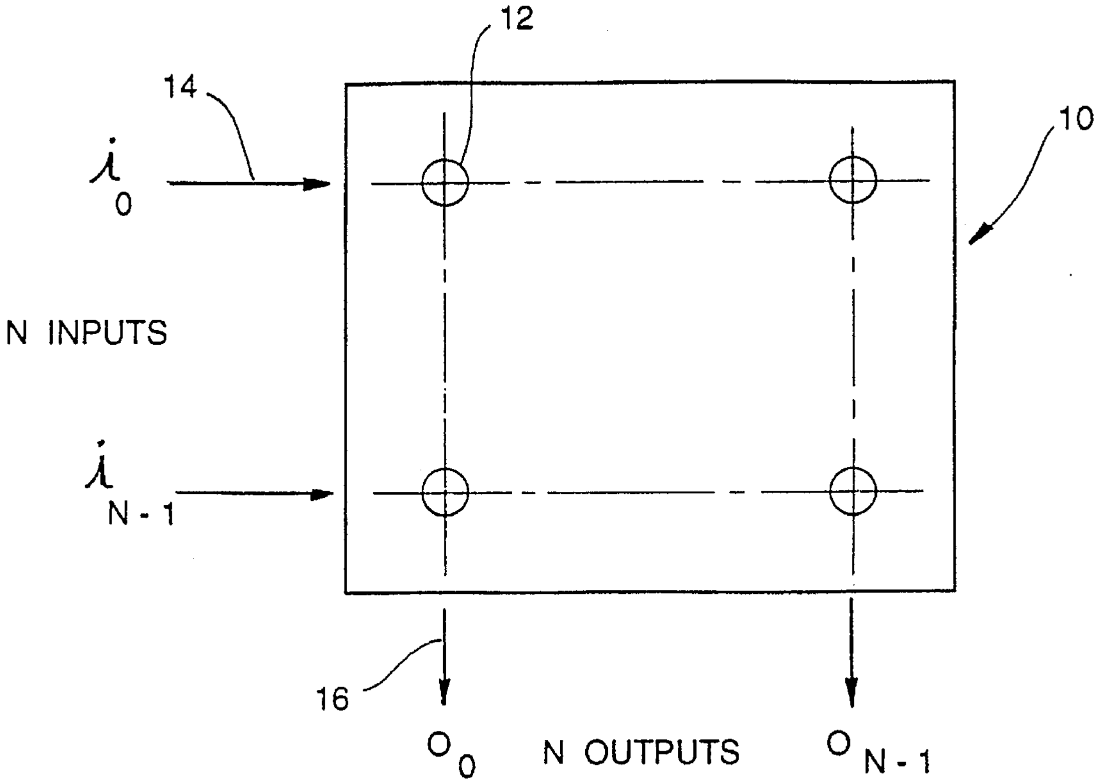
FIG. 1 is a diagrammatic illustration of a crossbar chip, of size N×N, as intended as part of the present invention.

Referring now to the drawing wherein the showings are for purposes of illustrating the preferred embodiments of the invention and not for purposes of limiting same, the FIGURES show a self routing crossbar switch suitable for use as a switching fabric in an ATM switch. The invention is particularly applicable to replace the Batcher/banyan network in a system such as is shown in U.S. Pat. No. 5,327,420, herein incorporated by reference.

The basic architecture of such a system is directed to high-speed, parallel transmission and switching of small, fixed sized data packets, called "cells". The first bits of each data packet, called a "header", contain an address indicative of an output port to which the packet should be routed.

FIG. 1 illustrates a crossbar chip 10 representing a fundamental element of the fabric, of size N×N, where N is a power of 2, which forms an N by N switching fabric. The fabric comprises a crosspoint array in which the crosspoints 12 are located at intersections of an input row 14 and output column 16. The inputs are illustrated as ranging from $I_0$ to $I_{n-1}$ and similarly, the outputs are represented as ranging from $O_0$ to $O_{n-1}$. It is, of course, the overall objective of the invention to transmit a cell from a one of the input ports through the fabric to a desired output port in a quick and reliable manner.

For such an ATM switch, each cell will be presented bits serially, most significant bit first, and will have the header pre-pended to the cell. Presentation of the cells will occur synchronously at all inputs 14. Thus, the self routing crossbar chip can compare all cell headers in lock step. If a given input is inactive during a cell time, it still presents a dummy cell, with the leading bit set to "0" to denote "inactive".

Figure 2:
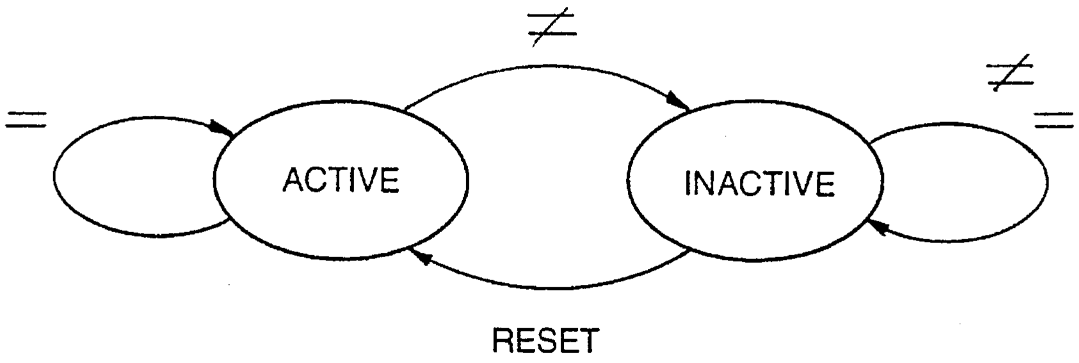
FIG. 2 defines the possible states of each state machine at the crosspoints of the chip of FIG. 1.

The address is in a form to identify the output column 16 to which the cell should be routed out within the N×N chip. Each chip 10 has $N^2$ internal intersections at the crosspoints between the rows and the columns. At each of the intersections is disposed a state machine having an operating character as shown in FIG. 2. The most significant bit of a field of the cell is transmitted first on the rows 14. At each state machine at the crosspoints 12, each bit of the address is compared against a hard wired bit sequence common to the column of the intersection. The sequence comprises a predetermined identity representative of the output port common to all state machines of the particular column. The array is completely regular if the address generated for each state machine is common to the column and not present at each state machine. If at any step in the sequential comparison the state machine makes a determination of "not-equal", then the state machine goes "not-active/disconnected". At the end of the addresses, only the active state machines can connect a particular row to the desired column output. In the case of maximum operating efficiency of the fabric, N cells, each on a one of the input rows, can be individually connected to the N output ports for simultaneous transmission through the switching fabric. In order to avoid conflicting cells seeking output to the same port, a reservation ring (not shown) insures that only one row will address a desired column, so that only one input will drive a given output. Co-pending application Ser. Nos. 08/447,673 disclose a reservation ring suitable for use with the switching fabric of the subject invention.

Figures 3, 4:
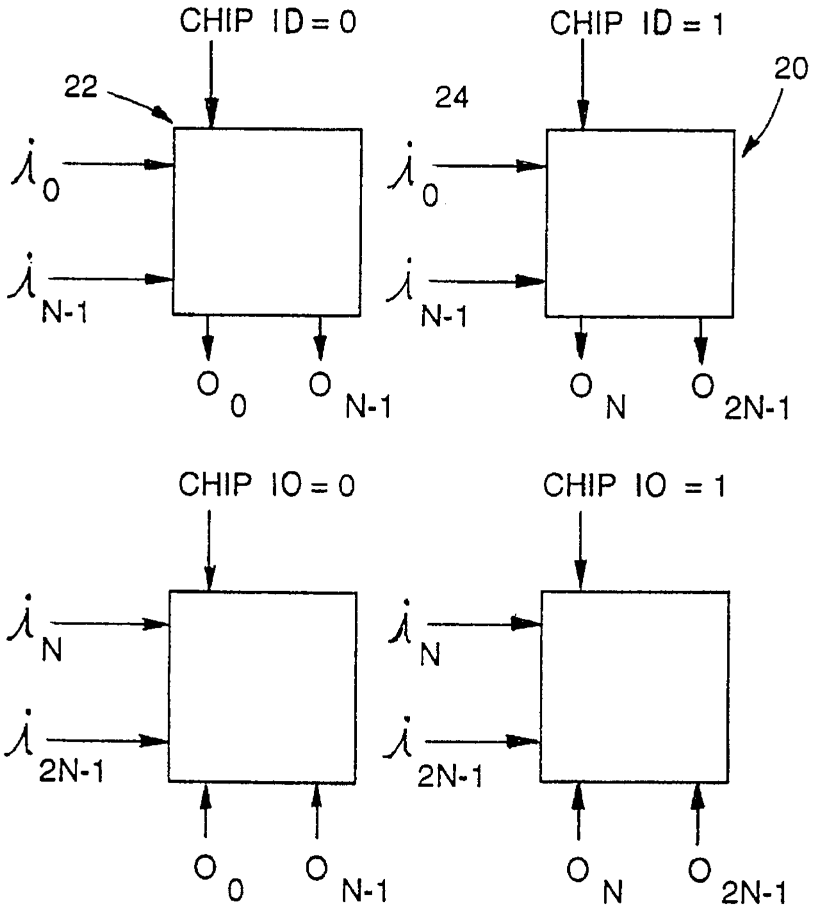
FIG. 3 illustrates a tabular sequence for comparing an address identity of an output port or column against header information of the cell packet.
FIG. 4 illustrates an array of the crossbar chips of FIG. 1 connected to form a switching fabric 2N×2N.

With particular reference to FIG. 3, a more detailed illustration of the subject invention is shown wherein a 4 by 4 switching fabric with columns numbered "00" through "11" are shown. It can be seen that the address comparing occurs in three time steps. During time step 0, the most significant bits are set to "1" to indicate that the cell is active. If the cell were inactive, the most significant bit would be set to "0". During time steps 1 and 2, the column is selected within the chip. It can be seen that the first column is identified by the sequence "00" and the fourth column is identified by the sequence "11". Thus, all rows will be compared against the sequence "100" for column "00" and against sequence "111" for column "11".

It is an important feature of the invention that the switching fabric 10 can be generalized to both larger fabrics than are possible with a single chip and to fabrics where there is a speed-up of k from the inputs to the outputs (analogous to the speed-up of k achievable with k banyans in a Batcher/banyan network).

Figures 5, 6:
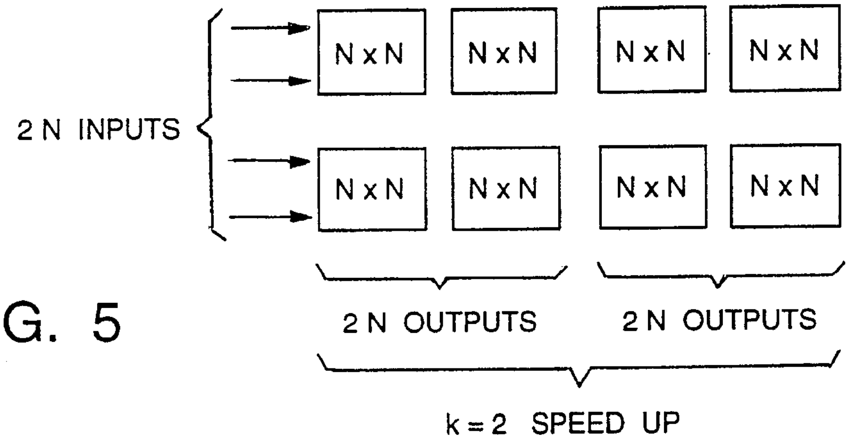
FIG. 5 shows an expanded switching fabric of the crossbar chips of FIG. 1 having a speed-up of 2.
FIG. 6 is a tabular illustration of the sequence for comparing header information against column identity in an 8 by 8 switching fabric with a speed-up of 2.

FIG. 4 shows an array 20 of four of the crossbar chips 10, each N by N in size, where N is a power of 2, connected to form a switching fabric of 2N×2N. The chips 10 are connected in 2 columns 22, 24 of two N by N crossbars, each crossbar column is given an identity by means of pins tied to ground or VCC. Thus, in addition to each individual output port having an identity, the two columns each have an identity as well. Also, as with Batcher/banyan networks, a speed-up of k can be achieved by multiplying the number of columns by k. For example, FIG. 5 shows such a circuit with 2N inputs and 2×2 N outputs for a speed-up value of k=2. The identity of the desired output port is represented by a single address in the form: [cell active/inactive, value of k, chip column, column within an N×N chip], so that each input to the switching fabric identifies by its address the desired output port.

With reference to FIGS. 5 and 6, the above address form can be specifically illustrated. FIG. 5 shows an 8 by 8 switching fabric with a speed-up of 2. There are sixteen columns spread across four columns of 4 by 4 chips, with the individual columns numbered "0000" through "1111". In FIG. 6, the sequence for comparing cell address against the identity of each column is shown. Thus, all rows will be compared against the sequence "10000" for column "0000" and against "11111" for column "1111". In time step 0, a comparison occurs to determine whether the cell is active or not active. In time step 1, the k value comparison occurs. In time step 2, the chip column comparison occurs and in time steps 3 and 4, the select column within each of the chips comparison occurs.

Figures 7, 8:
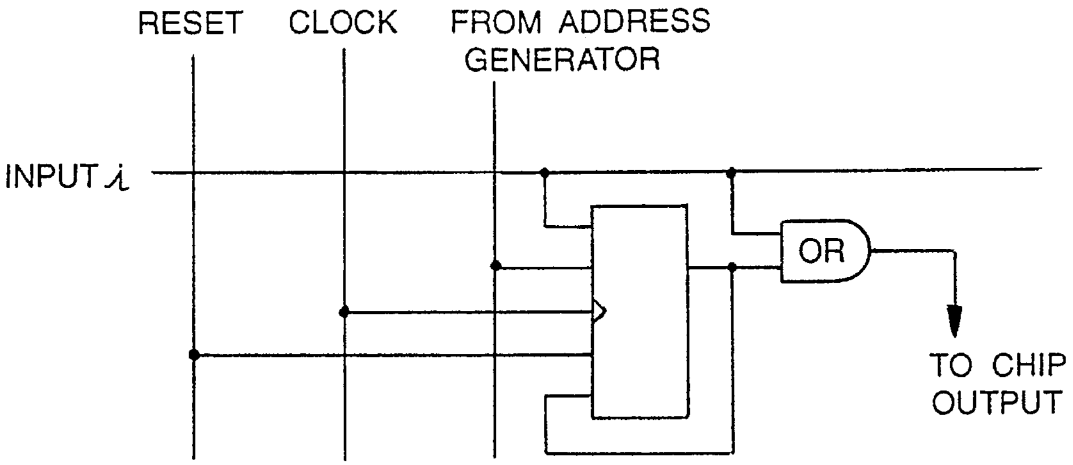
FIG. 7 shows a standard form synchronous state machine such as can be employed in the crosspoint array of the subject invention; and, FIG. 8 is a tabular definition of the state machine of FIG. 7.

With reference to FIGS. 7 and 8, one possible hardware permutation of a state machine having a state diagram as illustrated in FIG. 2 is shown. A state machine as shown in FIG. 7 will be disposed at each crosspoint 12 (FIG. 1) in the switching fabric 10. FIG. 8 provides a detailed definition of function for the state machine in FIG. 7. This implementation requires approximately twelve gate equivalents. A 128 by 128 self routing crossbar switch could be easily implementable using standard cell technology.

A particular advantage of the subject invention is that it is easier to diagnose failures in the switching fabric than in prior known Batcher/banyan networks. In particular, such prior art systems required each switching point to examine one or more of the cell header address bits to decide how to subsequently route the rest of the packet. The resulting virtual circuit was complex and it was hard to identify where failure occurred. The subject invention overcomes this problem by providing a simplified system wherein a failure can be located at the state machine in the column of the fabric common to the desired output port.

Another advantage of the subject invention is its ability to be readily expandable with better scaling properties. For example, a 2N Batcher/banyan network requires ten chips as opposed to the eight chips for a comparable self routing crossbar switch manufactured in accordance with the subject invention. Although it will be appreciated by one of ordinary skill in the art that for large N switching fabrics a Batcher/banyan may scale better than the subject invention.

The invention has been described with reference to the preferred embodiments. Obviously modifications and alterations will occur to others upon the reading and understanding of this specification. It is my intention to include all such modifications and alterations insofar as they come within the scope of the appended claims or the equivalents thereof.

Having thus described my invention, I now claim:

1. An expandable, self routing switching fabric for identifiably routing data packets in an ATM switch comprising:

a plurality of input ports and a plurality of output ports for routing a packet from an input source coupled to one of said input ports to an output destination coupled to one of said output ports on a selected circuit through the fabric specified by the packet; and, a crosspoint array of state machines, each state machine disposed at an internal intersection of an input port and an output port, wherein each state machine has a predetermined identity representative of a singular one of the output ports and means for routing the packet to the singular one of the output ports and wherein each state machine futher includes a means for comparing the identity to an address header of each data packet and for setting each state machine active/connected when the comparing determines a match between the identity and the address header and for setting each state machine not active/disconnected when the comparing determines a non-match between the identity and the address header, whereby the selected circuit through the fabric to a desired output port comprises an active/connected state machine defined by the address for connecting the one of the input ports to the one of said output ports.

2. The switching fabric as defined in claim 1 wherein the input ports comprise a plurality of rows of the crosspoint array each one of the plurality of rows including a first plurality of the state machines, said first plurality of state machines on each row having a different identity representative of the singular one of the output ports, and wherein the output ports comprise a plurality of columns of the crosspoint array each one of the plurality of columns including a second plurality of state machines, all said second plurality of state machines on each column having a common identity representative of the singular one of the output ports, and wherein the selected circuit comprises one of the columns of active/connected state machines defined by the desired output port.

3. The switching fabric as defined in claim 2 wherein the predetermined identity of each state machine comprises a hardwired bit sequence common to the one of the columns including said each state machine.

4. The switching fabric as defined in claim 1 wherein the switching fabric comprises an N plurality of input ports and a kN plurality of output ports where k is an integer representing a speed up of the switching fabric from the input ports to the output ports.

5. The switching fabric as defined in claim 4 wherein the address header comprises a form representative of data packet active/inactive, a value of k, a chip column and column within an N×N chip, wherein the switching fabric is comprised of a plurality of N×N chips.

6. The switching fabric as defined in claim 1 wherein the address header comprises a sequence of bits and the means for comparing includes means for sequentially comparing the state machine identity and the bits of the address header, said state machine being set inactive/disconnect upon a non-match of a first one of the sequence of bits and a corresponding one of a first bit of the state machine identity.

7. The switching fabric as defined in claim 6 wherein said state machine includes means for remaining inactive/disconnected from said non-match of a first one of the sequence of bits, until reset upon completion of the data packet routing through the fabric.

* * * * *